April 29, 1930. I. G. SHARPE 1,756,262
MACHINE FOR CORING CABBAGES OR THE LIKE
Filed Nov. 4, 1927 4 Sheets-Sheet 1

Inventor
Ira G. Sharpe
By Owen & Owen
Attorney

April 29, 1930.  I. G. SHARPE  1,756,262
MACHINE FOR CORING CABBAGES OR THE LIKE
Filed Nov. 4, 1927  4 Sheets-Sheet 2
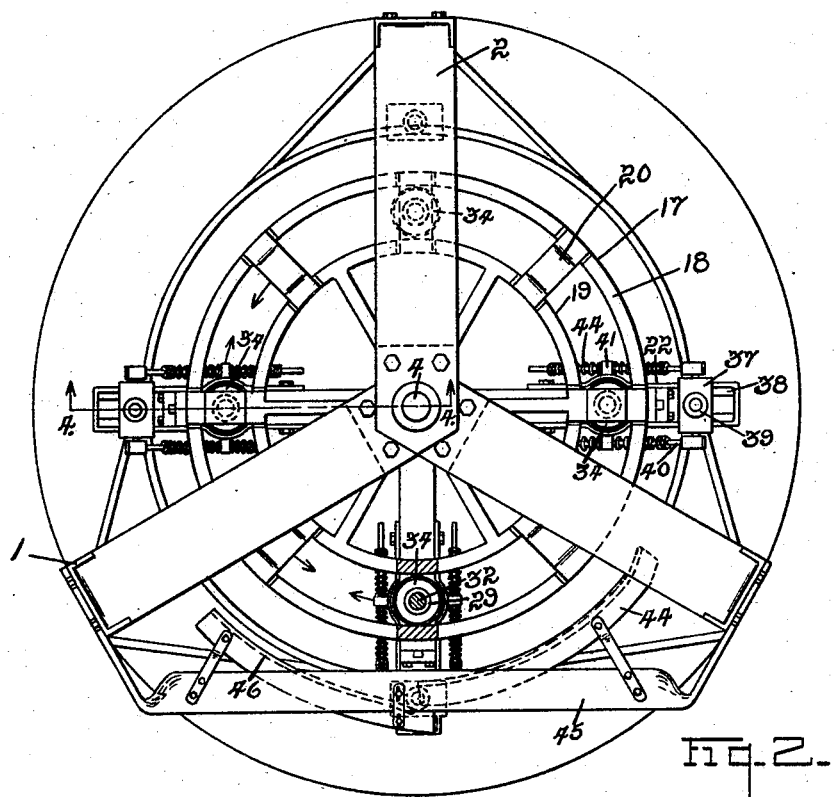
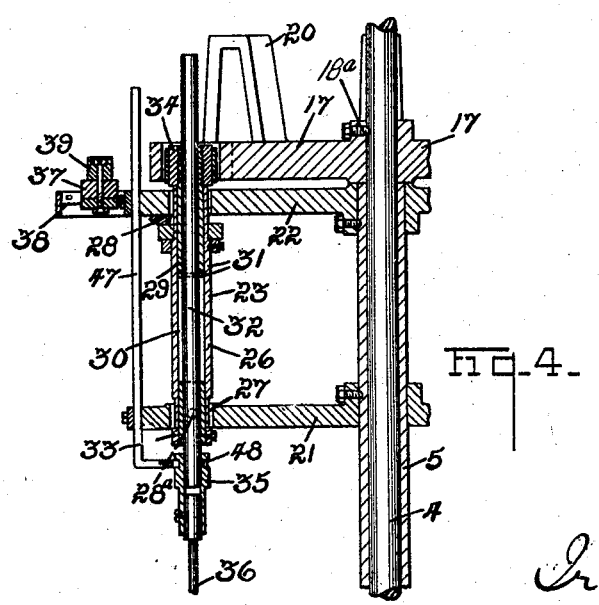
Inventor
Ira G. Sharpe
By Owen & Owen
Attorneys April 29, 1930. I. G. SHARPE 1,756,262
MACHINE FOR CORING CABBAGES OR THE LIKE
Filed Nov. 4, 1927 4 Sheets-Sheet 3

Inventor
Ira G. Sharpe
By Owen & Owen
Attorney

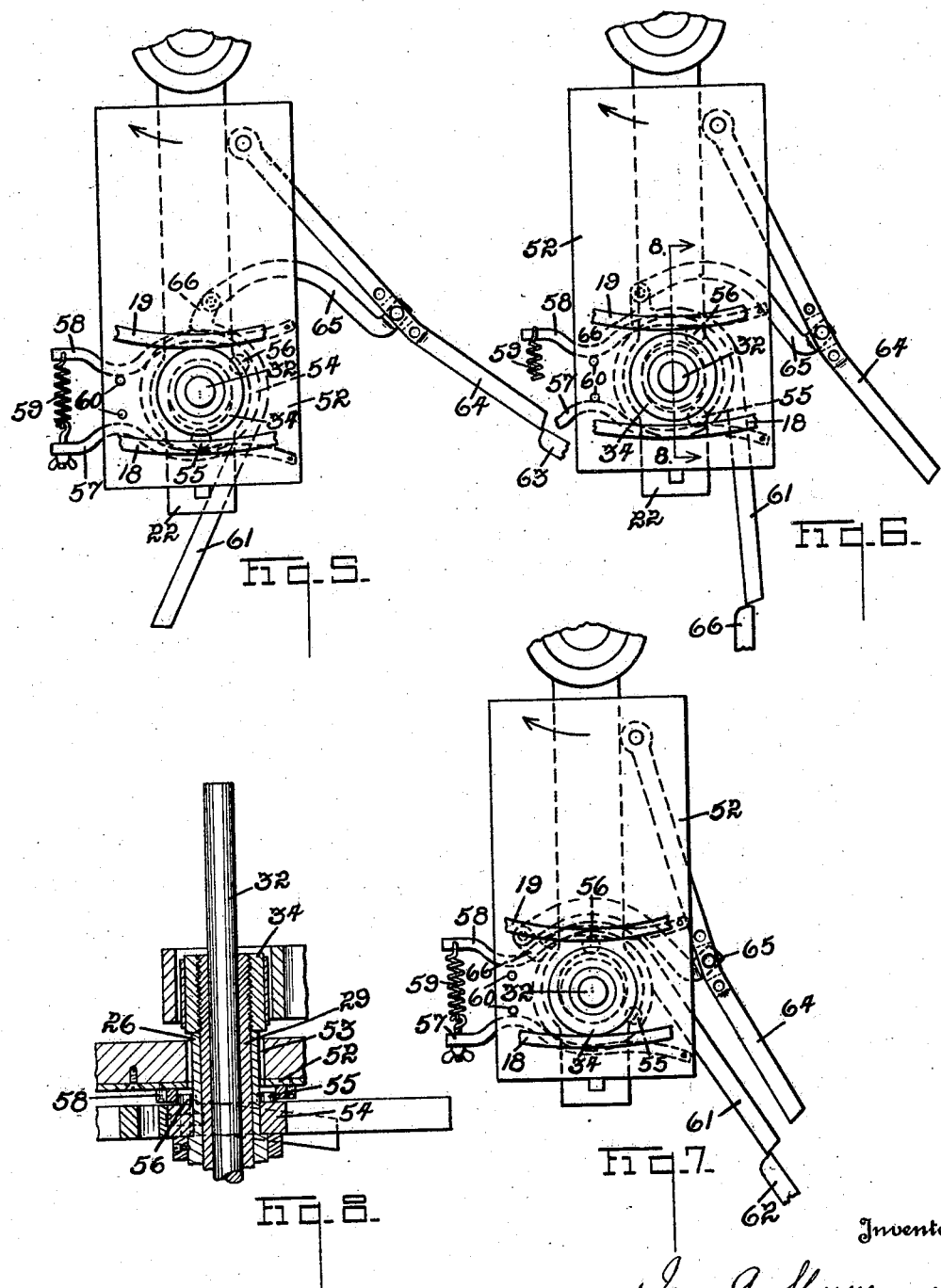

Patented Apr. 29, 1930

1,756,262

UNITED STATES PATENT OFFICE

IRA G. SHARPE, OF LIBERTY CENTER, OHIO

MACHINE FOR CORING CABBAGES OR THE LIKE

Application filed November 4, 1927. Serial No. 230,960.

This invention relates to automatic cutting machines, but more particularly to machines for coring cabbages in which a cutting element is forced into the core of the cabbage to shred the same, and thereafter is reversed to remove the cutting element from the cabbage without removing the cabbage core, although a different knife may be used to remove the heart, if desired.

Heretofore it has been customary in coring cabbages for the operator to hold the cabbage and force the same into contact with the rotating knife, the operation of which is usually controlled by a foot pedal. It is obvious that great care must be taken by the operator in coring small cabbages, or the knife will lead from a directed course causing the operator's hand to come in contact with it. It is further apparent that this method is not only dangerous, but is most inefficient, because the expense is relatively great and quantity of production is limited.

Objects of this invention are to produce a simple and efficient machine for coring cabbages or for similar or analogous workings, which is entirely automatic in operation; and which is safe to operate; and to produce a machine of the above character having the new and improved features of arrangement and construction hereinafter described.

Other objects and advantages will hereinafter appear.

Figure 1:
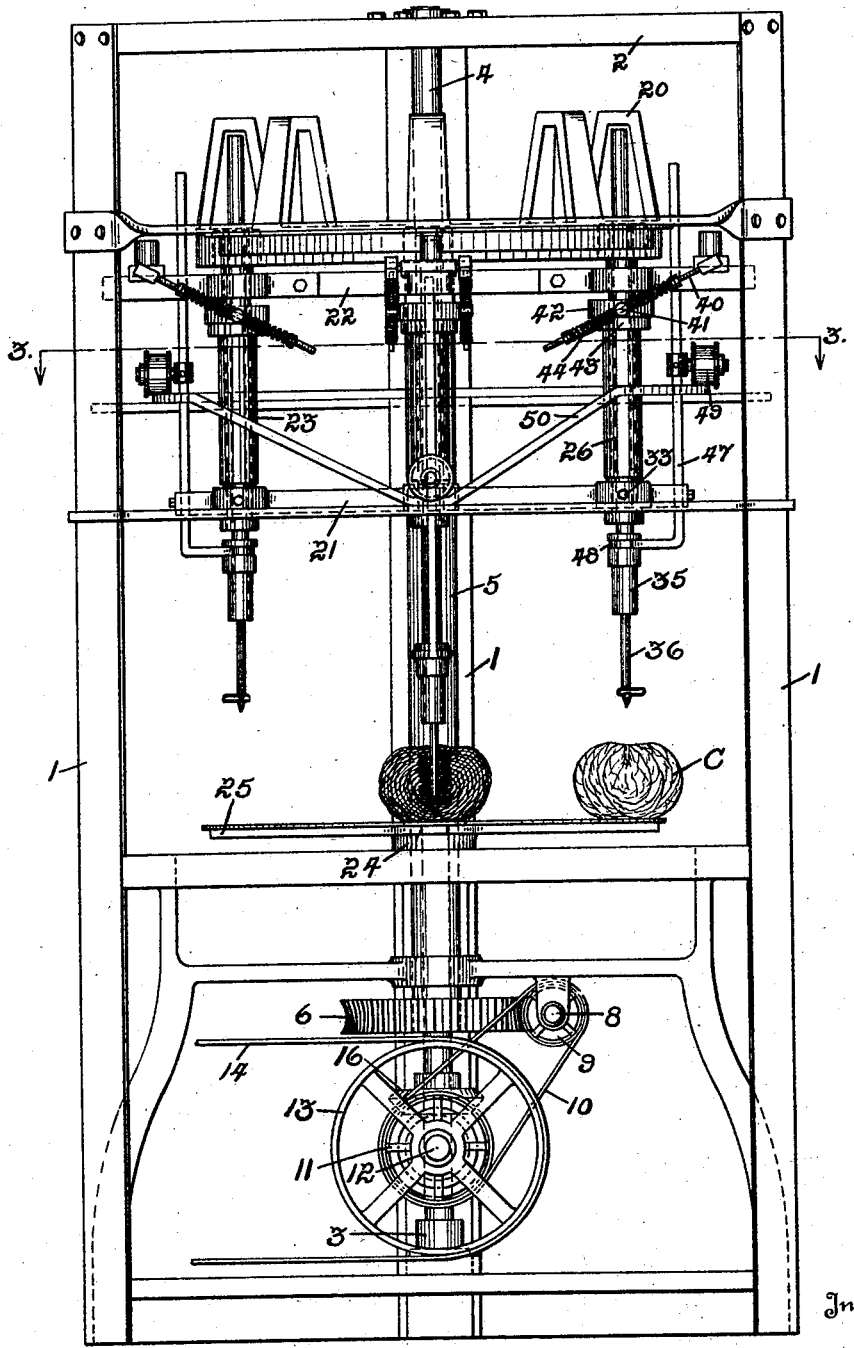
Figure 3:
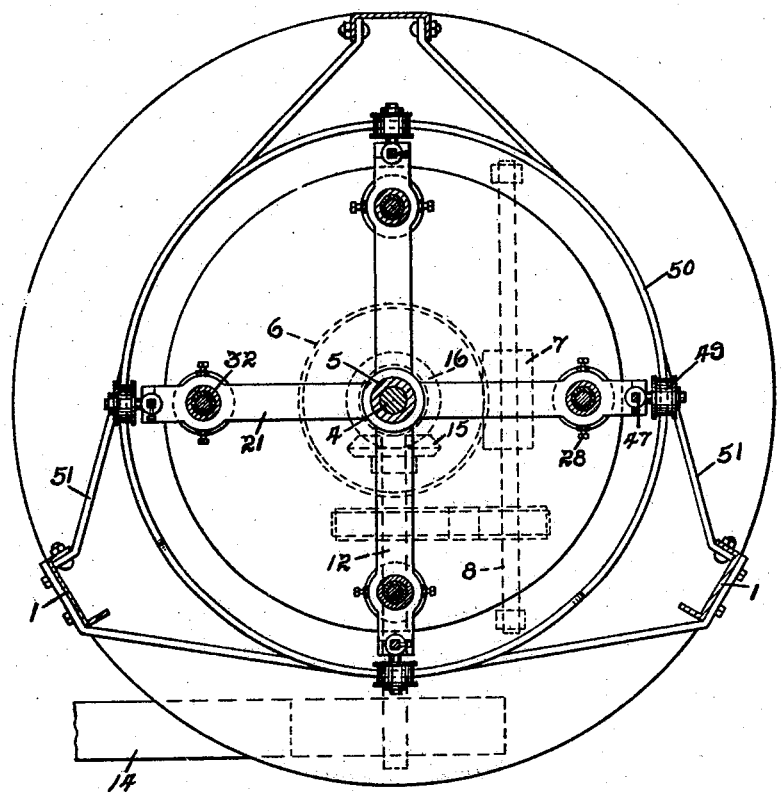

The invention is shown by way of illustration in the accompanying drawings, in which:

Fig. 1 is a vertical sectional elevation of a machine constructed in accordance with my invention; Fig. 2 is a top plan view of the machine shown in Fig. 1; Fig. 3 is a transverse section on the line 3—3 of Fig. 1; Fig. 4 is a fragmentary sectional elevation of a cutting head; Figs. 5, 6, and 7 are fragmentary plan views of an alternate form of mechanism for shifting the friction roller, and Fig. 8 is a section on the line 8—8 of Fig. 6.

The illustrated embodiment of the invention comprises a frame having channel beam uprights or supports 1, there being three in number connected to the top at the upper ends thereof by horizontal braces 2. Disposed centrally of the frame and having bearing in the connecting braces 2 at the upper end, and a suitable bearing 3 at the lower end portion of the frame is a rotating drive shaft 4. Surrounding the shaft 4 for the major portion of its length is a sleeve 5, to which is secured a worm wheel 6, meshing with a worm 7 on a horizontal shaft 8. Mounted on the shaft 8 is a pulley wheel 9 which is connected through a belt 10 with a pulley wheel 11 on the shaft 12. The shaft 12 has a pulley wheel 13, which may be connected by a belt 14 with any suitable source of power, such as an electric motor. Secured to the shaft 12 is a beveled gear 15 meshing with a gear 16 on the vertical shaft 4. In accordance with the above described drive, it will be understood that the shaft 4 is rapidly rotated, and the sleeve 5 is rotated at a much slower speed.

Secured to the upper end portion of shaft 4 by a set screw 18ª is a ring-like member or main driver 17, which rotates with the shaft. The main driver 17 includes an outer drive rim 18 and an inner drive rim 19, and the rims 18 and 19 are concentric and spaced laterally or horizontally from each other. At suitably spaced intervals are vertically arched spanner members 20, which join the rims 18 and 19. The spanner members 20 provide clearance for the upward movement of the cutter driving shafts, as will hereinafter appear.

Rotatable with the sleeve 5 are spiders 21 and 22, which are arranged in vertically spaced relation with the arms thereof disposed in alignment with each other. The spiders 21 and 22 serve to receive and support the cutting heads 23, there being four employed in this machine. The cutting heads 23 revolve about the sleeve 5 with the spiders 21 and 22, and travel in a direction opposite to the movement of the main driver 17. Each cutting head is adapted to be driven from the main driver 17, a roller being employed frictionally to engage one rim or another of the main driver to rotate the cutting element in one direction or the other. According to the present machine, the cutting element is rotated only during the cutting period, after which, rotation ceases.

Supported on a collar 24 on the sleeve 5 is a table 25 to receive cabbages C, which are properly aligned by the operator with respect to the cutting elements of each head, so that as the cutting elements are brought into operation, the cabbages are properly positioned for cutting.

Each cutting head comprises an outer non-rotatable bearing sleeve 26, one end of which extends loosely through an opening 27 in the spider 21, and the opposite end thereof extends loosely through an opening 28 in the spider 22. The bearing sleeve 26 is pivotally connected by removable trunnions 28ª to the spider 21 so that the sleeve may be rocked horizontally in one direction or another. Disposed within the bearing sleeve 26 is a rotatable driving sleeve 29 having diametrically opposed elongate slots 30 to receive a pin 31 on a driven shaft 32. Engaging the lower end portion of the inner rotatable sleeve 29 is a collar 33 secured thereto by a set screw, and this collar prevents upward movement of the sleeve 29.

Secured on to the upper end of the driving sleeve 29 is a drive roller 34 having a suitable friction-producing facing, and which is positioned in the space between the rims 18 and 19 of the main driver 17. By virtue of the pivotal mounting of the outer sleeve 26, the head is adapted to be swung to one side to engage one rim for rotating the cutting element in one direction or swung to the opposite rim for driving the cutting element in the reverse direction, as will hereinafter be apparent.

Fixed to the lower end portion of the driven shaft 32 is a sleeve or chuck 35 to receive the shank of the cutter element 36, which may be of the usual construction for coring cabbages. It is manifest from the above description that the cutter element 36 may be rotated in one direction or another, and during such rotation, moved vertically because of the slotted construction of the inner driving sleeve 29 and shaft 32. The cutter element is shown in Fig. 4 in raised position with the pin 31 in the extreme upper position of the slots 30.

It is desired first to rotate the cutter element 36 in one direction to effect cutting of the cabbage core, and abruptly thereafter, to reverse the direction of rotation during the removal of the cutter element from the cabbage, the cabbage and cutter element being moved relatively to each other to force the cutter element in and out of the cabbage. It is necessary that the change in direction of rotation be instantaneous so as to complete the cutting operation as promptly as possible. For this reason the friction roller must be quickly moved from one rim to the other, and for this purpose, a block 37 is slidable longitudinally on the outer end portion of each arm of the spider 22, a track 38 being provided to guide each block 37. Mounted on the block 37 is a vertically disposed roller 39, and pivoted to each side of the block 37 is an arm 40 which extends through a lug 41 on a collar 42 loosely mounted on the sleeve 26, supporting collar 43 on the sleeve 26 holding the collar 42 in position. Disposed on opposite sides of the lug 41 are coil springs 44, thereby serving to hold the roller 39 in the desired position.

As the spider 22 rotates with the sleeve 5, the roller 39 engages a cam track 44 suitably connected to a brace 45 fixed to the legs 1. Each roller 39 successively engages the outer side of the cam track 44, and moves the respective cutting head outwardly so that the friction roller 34 engages the outer rim 18. By engagement of the roller 34 with the outer rim 18 which is rapidly rotated by the drive shaft 4, it is apparent that the cutter element 36 is constantly driven. So long as the roller 39 remains in engagement with the cam track 44, the cutter element 36 will be rotated in one direction by the outer rim 18.

After the roller 39 has completed its travel, over the cam track 44, it engages the inner side of a second cam track 46 also connected to the brace 45. The cam track 46 forces the roller 39 inwardly and swings the cutter head abruptly away from the rim 18 and into engagement with the inner rim 19, thereby instantaneously reversing the direction of rotation of the cutter element. It will thus be seen that the change in rotation from one direction to the other takes place suddenly, in fact the change is made so suddenly that it is almost impossible to be seen with the naked eye. During the remainder of the travel of the cutter head, the friction roller 34 travels freely between the inner and outer rims 19 and 18, respectively. It is apparent that each cutter head operates similarly to that above described when encountering the cam tracks, and after passing from the cam tracks rotation of the cutter element automatically stops.

In accordance with the invention, the cutter elements are successively lowered to the table 25, to be brought into engagement with a cabbage, and after the cabbage core is cut, it is lifted away from the cabbage. The mechanism for vertically moving the cutting element, is arranged to operate concomitantly with the rotating of the cutter head, so that when each cutter element is moved downwardly, it is rotated in one direction, and as the cutter element is moved upwardly, it is rotated in the opposite direction.

The vertical movement of each cutter element is controlled independently of the remainder, and for this purpose each cutter head is provided with a vertically disposed arm 47 having a forked end engaging an annular groove 48 in the chuck sleeve 35. The arm 47 is in sliding engagement with the spider 21, and is provided with a roller 49 adjustable thereon. The roller 49 engages a circular track 50, which is supported by braces 51 suitably secured to the frame legs 1. Beneath the cam track 44 the circular track 50 gradually inclines downwardly, and the lowermost portion of the track is substantially in alignment with the outer end of the cam track 44.

The circular track 50 then inclines gradually upwardly and the angle of this inclination is slightly less than that of the downwardly inclined portion, because of the fact that the drive roller 34 in engagement with the inner drive rim 19 is rotated at less speed than in the opposite direction. The upwardly inclined portion of the circular track 50 is disposed beneath the cam track 46, and is substantially the same length thereof. Upward movement of the shaft 32 is permitted by the pin and slot connection, and clearance for such movement is provided by the respective arched spanner member 20.

An alternative mechanism for shifting the drive roller 34 is shown in Figs. 5 to 8 in which a supporting plate 52 is attached to the under side of each arm of the spider 22, and each plate is formed with an opening 53 through which the sleeves 26, 29 and 32 extend. Surrounding the sleeve 26 below the supporting plate 52 is a collar 54 loosely mounted thereon, and having a pair of vertically disposed cam rollers 55 and 56, which are arranged approximately 90° apart at one side of the diameter of the collar. Engaging opposite sides of the collar 54 are arms 57 and 58, pivotally connected at their inner ends to the plate 52, and yieldingly urged toward each other by a coil spring 29 which connects their opposite ends, stops 60 being provided on the plate 52 against which limit the inward movement of the arms.

Fixedly secured to the collar 54 and projecting therefrom is an arm 61, which is adapted to move the collar in one direction or the other. Assuming that the spider 22 is moving in the direction of the arrow in Fig. 2, a dog or projection 62 on the frame is arranged at the top of the downward incline of the circular track 50 and upon engagement of the arm 61 with the projection 62, the collar 54 is rotated in a counter clockwise direction so that the cam roller 56 swings the arm 58 away from the collar, and as the roller 55 has moved away from the arm 57, the coil spring operates to swing the friction roller 34 and associated parts into engagement with the outer rim 18, as shown in Fig. 2.

At the bottom of the track incline, another dog or projection 63 is positioned to be engaged by a reverse lever for swinging the friction roller 34 into engagement with the inner rim 19. As shown, the reverse lever comprises an arm 64 pivoted to the plate 52, and connected to an intermediate portion of the arm 64 is a link 65 pivoted to a lug 66 on the cam collar 54. When the arm 64 engages the dog 63 the collar 54 is rotated in a clockwise direction, and the roller 55 forces the arm 57 outwardly to permit the coil spring 59 to swing the friction roller and associated parts into engagement with the inner rotating rim 19, it being observed that the cam roller 56 is moved away from the arm 58.

In order to return the parts to normal position so that the friction roller 34 is not in operative engagement with either rim, a third dog 66 is positioned adjacent the upper extremity of the upper incline of the track to be engaged by the arms 61. This stop is so arranged that the travel of the spider 22 operates to move the cam sleeve sufficiently to place the cam rollers 55 and 56 in engagement with their respective arms 57 and 58. In this manner it will be seen that the arms 57 and 58 hold the cam rollers in neutral position, in which the friction roller 34 is removed from driving engagement with either rim.

Although I have shown and described my invention in connection with a machine for coring cabbages, it is to be understood that I do not restrict the use of the machine to cabbages, as it is equally well adapted as a cutting instrumentality in connection with other commodities and objects. It is further to be understood that the above description is given by way of illustration and not of limitation, and numerous changes may be effected in details of construction, arrangement and operation without departing from the spirit of the invention, especially as defined in the appended claims. It is further to be understood that number of spider arms may be varied, as desired, in accordance with the number of cutting heads employed.

What I claim as new and desire to secure by Letters Patent is:

1. In a machine of the character described, a frame, a cutter head carried by said frame, said cutter head including a friction roller, laterally spaced concentric driving annuli between which said friction roller is arranged, means for rotating said annuli in the same direction, and means to swing said friction roller to engage one annulus for driving said roller in one direction and after a predetermined period abruptly to move said roller to engage the other annulus.

2. In a machine of the character described, a rotatable frame, cutter heads on said frame, each cutter head including a friction roller and an axially reciprocable shaft connected for rotation with said friction roller, laterally spaced concentric driving annuli, means for rapidly rotating said drive annuli in the same direction, means to cause said roller to engage one annulus for rotating the roller for a predetermined period in one direction, and then abruptly to swing the roller into engagement with the other annulus for rotating the roller in the opposite direction for a predetermined period, a work-supporting table, and means to cause relative movement of said cutting elements and table toward each other when said cutting element is rotated in one direction and away from each other when said cutting element is rotating in the opposite direction.

3. In a machine of the character described, a frame, a cutter head carried by said frame including a friction roller, means for pivoting said head to said frame, laterally spaced concentric drive annuli between which said roller is arranged, means for causing said roller to operatively engage one annulus or the other for causing said roller to rotate in one direction or the other, said means including a cam collar and lever arms projecting from said collar, and projections on said main frame engageable with said arms during the rotation of said rotatable frame for causing said friction roller successively to engage one annulus and then the other annulus and then to be positioned between the two annuli.

4. In a coring machine, a series of cutters, means to impart traveling movement to said cutters, a work table, means to move the table in accordance with the traveling movement of said cutters, means to impart relative movements to said table and cutters to cause each cutter to approach and move away from the table during a predetermined portion of the travel thereof, and means to rotate said cutters only at said predetermined portion in one direction during relative movement toward the table and in the opposite direction during relative movement away from the table.

5. In combination with a work table and means to operate same, a series of normally inoperative corers, means to impart traveling movement to said corers as a unit with respect to the movement of the work table, means to effect relative vertical movement between the table and corers, means to rotate each corer clockwise during said vertical movement in one direction and during said movement of the corers as a unit, and means to rotate each corer counter-clockwise during said vertical movement in the opposite direction and during said movement of the corers as a unit.

6. In a coring machine, a normally inoperative corer, means on one side of the corer to rotate same in one direction, means on the opposite side of the corer to rotate same in the opposite direction, and automatic means operable at a predetermined period to effect relative movement between the corer and each of the rotating means.

7. A coring machine having a vertically movable corer, said corer comprising a non-rotatable sleeve, a rotatable sleeve within said non-rotatable sleeve, a driven shaft in said inner sleeve, a connection between said shaft and inner sleeve to permit vertical sliding movement during rotation thereof, a cutter element connected to said shaft, and means to rotate said inner sleeve in one direction for a predetermined period, and then abruptly reverse the direction of rotation for a predetermined period.

8. A coring machine having a vertically movable corer, said corer comprising a non-rotatable sleeve, a rotatable sleeve within said non-rotatable sleeve, a driven shaft in said inner sleeve, a connection between said shaft and inner sleeve to permit vertical sliding movement during rotation thereof, a cutter element connected to said shaft, and means for moving said driven shaft and cutter element downwardly during rotation in one direction and upwardly during rotation in the opposite direction.

9. A coring machine having a vertically movable corer, said corer comprising a pair of telescoping sleeves, one sleeve being rotatable and the other sleeve being non-rotatable, a shaft within said sleeve, a connection between said shaft and said rotatable sleeve to permit sliding movement during rotation thereof, a cutter element connected to rotate with said shaft, means on one side of said rotatable sleeve for rotating the same in one direction, a second means on the other side of said rotatable sleeve for rotating the same in the opposite direction, and means for moving the rotatable sleeve into operative engagement with the first driving means for a predetermined period, and then abruptly to move the rotatable sleeve into engagement with said second means for a predetermined period.

10. A coring machine comprising a vertically movable corer, said corer comprising a non-rotatable sleeve, means for pivotally mounting one end portion of said sleeve, a rotatable sleeve within said first sleeve, a shaft within said inner sleeve, a connection between said shaft and inner sleeve to permit vertical sliding movement during rotation thereof, a cutter element connected to be driven by said shaft, means on one side of said inner sleeve for rotating the sleeve in one direction, a second means on the other side of said inner sleeve to rotate same in the opposite direction, and means to swing the inner sleeve into operative engagement with said first driving means for a predetermined period, and then abruptly to swing the same into engagement with the second means for a predetermined period.

11. In a coring machine, a pair of vertically spaced rotatable supporting members, means to rotate such supporting members, a corer carried by said members, said corer comprising a non-rotatable sleeve loosely connected to said supporting members, a pivotal connection between said sleeve and one of said supporting members, a rotatable sleeve within said non-rotatable sleeve, a driven shaft within said rotatable sleeve, a connection between said inner shaft and sleeve to permit vertical sliding movements during rotation thereof, a cutter element connected to be driven by said shaft, means to rotate said inner sleeve in one direction and then in the opposite direction, and means to move said cutter element downwardly during rotation thereof in one direction and upwardly during rotation in the opposite direction, said movements taking place during the rotating movement of said supporting members.

12. In a coring machine, a vertically movable corer, means on one side of said corer to rotate the same in one direction, means horizontally spaced from said first means on the opposite side of the corer to rotate the same in the opposite direction, means to effect relative movement between said corer and each of said rotating means for causing said corer to rotate in one direction for a predetermined period, and then abruptly change to rotation in the opposite direction for a predetermined period, and means to impart downward movement to said corer during rotation thereof in one direction and upward movement during rotation in the opposite direction.

13. In a coring machine, a vertically movable corer, means on one side of said corer to rotate the same in one direction, means horizontally spaced from said first means on the opposite side of the corer to rotate the same in the opposite direction, means to effect relative movement between said corer and each of said rotating means for causing said corer to rotate in one direction for a predetermined period, and then abruptly change to rotation in the opposite direction for a predetermined period, means to impart downward movement to said corer during rotation thereof in one direction and upward movement during rotation in the opposite direction, and means to impart traveling movement to said corer during the rotating and vertical movements thereof.

14. In a coring machine having a corer, means to impart traveling movement to said corer, means on one side of said corer to rotate the same in one direction, means spaced horizontally from said first rotating means and on the opposite side thereof to rotate said corer in the opposite direction, and cam means operable during the traveling movement of the corer to move the same into engagement with one rotating means for a definite period, and then abruptly to move the corer into engagement with the other rotating means for a definite period.

15. In a machine of the character described, a movable frame, a normally inoperative cutter head on said frame, said cutter head including a rotary cutting element and a rotatable and axially movable shaft, a work-supporting table, a track having contiguous downwardly and upwardly inclined portions, a connection between said shaft and track for causing said shaft to move toward and away from the table during movement of said frame, and means operable at a predetermined period in the movement of said frame to rotate said cutting head in one direction as the same approaches the table, and in the opposite direction as the same is moved away from the table.

16. In a coring machine, a series of normally inoperative corers, a work holder, means to move the series so as to successively cause the corers to travel past a given operative location, and means to render each corer operative as same reaches said location.

In testimony whereof I have hereunto signed my name to this specification.

IRA G. SHARPE.